United States Patent
Xu et al.

(10) Patent No.: US 11,614,669 B2
(45) Date of Patent: Mar. 28, 2023

(54) ARRAY SUBSTRATE AND PREPARATION METHOD THEREOF, DISPLAY PANEL AND DRIVING METHOD THEREOF

(71) Applicants: Hefei Xinsheng Optoelectronics Technology Co., Ltd., Hefei (CN); BOE TECHNOLOGY GROUP CO., LTD., Beijing (CN)

(72) Inventors: Jiawei Xu, Beijing (CN); Qin Zeng, Beijing (CN); Xintao Wu, Beijing (CN); Qidi Wu, Beijing (CN); Wenjin Fan, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 89 days.

(21) Appl. No.: 17/183,238

(22) Filed: Feb. 23, 2021

(65) Prior Publication Data

US 2021/0271146 A1 Sep. 2, 2021

(30) Foreign Application Priority Data

Feb. 28, 2020 (CN) .......................... 202010128262.1

(51) Int. Cl.
*G02F 1/163* (2006.01)
*G02F 1/1524* (2019.01)
(Continued)

(52) U.S. Cl.
CPC .......... *G02F 1/163* (2013.01); *G02F 1/13338* (2013.01); *G02F 1/13439* (2013.01);
(Continued)

(58) Field of Classification Search
CPC .... G02F 1/163; G02F 1/1524; G02F 1/13338; G02F 1/133553; G02F 1/13439; G02F 1/155; G02F 2201/44
See application file for complete search history.

(56) References Cited

U.S. PATENT DOCUMENTS

2017/0293378 A1* 10/2017 Ahn ................... G06V 40/1306

FOREIGN PATENT DOCUMENTS

| CN | 103337510 A | 10/2013 |
|---|---|---|
| CN | 103730481 A * | 4/2014 |

(Continued)

OTHER PUBLICATIONS

First Office Action for CN Patent Application No. 202010128262.1 dated Jan. 25, 2022.

*Primary Examiner* — Nathanael R Briggs
(74) *Attorney, Agent, or Firm* — Xsensus LLP

(57) ABSTRACT

The present disclosure provides an array substrate and a preparation method thereof, a display panel and a driving method thereof, which belongs to the field of display technology. The array substrate includes a base substrate, a driving circuit layer, a reflective electrode layer, a light-emitting layer, an electrochromic layer, and a common electrode layer. The driving circuit layer is provided with a first and second driving circuit. The reflective electrode layer is provided on a side of the driving circuit layer away from the base substrate and provided with a first and second reflective electrode insulated from each other. The light-emitting layer includes a light-emitting unit arranged on the surface of the second reflective electrode away from the base substrate. The electrochromic layer is arranged on the surface of the first reflective electrode away from the base substrate. The common electrode layer covers the electrochromic layer and the light-emitting unit.

14 Claims, 6 Drawing Sheets

(51) Int. Cl.
  *G02F 1/1333*  (2006.01)
  *G02F 1/1335*  (2006.01)
  *G02F 1/1343*  (2006.01)
  *G02F 1/155*   (2006.01)

(52) U.S. Cl.
  CPC ........ *G02F 1/133553* (2013.01); *G02F 1/155* (2013.01); *G02F 1/1524* (2019.01)

(56) References Cited

FOREIGN PATENT DOCUMENTS

| | | | | |
|---|---|---|---|---|
| CN | 103730481 A | | 4/2014 | |
| CN | 109037471 A | | 12/2018 | |
| CN | 109300968 A | | 2/2019 | |
| CN | 109326222 A | * | 2/2019 | ............ G02F 1/155 |
| CN | 109326222 A | | 2/2019 | |
| CN | 110268315 A | | 9/2019 | |
| CN | 110828695 A | | 2/2020 | |
| EP | 2207220 A2 | | 7/2010 | |

* cited by examiner

ARRAY SUBSTRATE AND PREPARATION METHOD THEREOF, DISPLAY PANEL AND DRIVING METHOD THEREOF

CROSS-REFERENCE TO RELATED APPLICATION

This application claims the benefit of and priority to Chinese Patent Application No. 202010128262.1 filed on Feb. 28, 2020, the contents of which being incorporated by reference in their entirety herein.

TECHNICAL FIELD

The present disclosure relates to the field of display technology and, in particular to an array substrate and a preparation method thereof, as well as a display panel and a driving method thereof.

BACKGROUND

The mirror display panel has both a mirror function and a display function, and has a huge application prospect in the field of smart home and commercial display. Current mirror display panels include a mirror reflection layer to function as a mirror, but the high reflectivity (about 50%) of the mirror reflection layer reduces the overall transmittance and contrast. It is necessary to increase the light source intensity of the display module to achieve display visualization.

The above-mentioned information disclosed in the background section is only used to enhance the understanding of the background of the present disclosure, so it may include information that does not constitute the prior art known to those of ordinary skill in the art.

SUMMARY

The purpose of the present disclosure aims to provide an array substrate and a preparation method thereof, as well as a display panel and a driving method thereof, which can turn on or turn off the mirror display function and improve the contrast of the display image.

In order to achieve the above-mentioned purpose of the disclosure, the present disclosure adopts following technical solutions.

According to a first aspect of the present disclosure, there is provided an array substrate, including:

a base substrate;

a driving circuit layer provided on a side of the base substrate, wherein the driving circuit layer is provided with a first driving circuit and a second driving circuit;

a reflective electrode layer provided on a side of the driving circuit layer away from the base substrate, wherein the reflective electrode layer is provided with a first reflective electrode and a second reflective electrode, the first reflective electrode is electrically connected to an output terminal of the first driving circuit and insulated from the second reflective electrode, and the second reflective electrode is electrically connected to an output terminal of the second driving circuit;

a light-emitting layer including a light-emitting unit disposed on a surface of the second reflective electrode away from the base substrate;

an electrochromic layer provided on a surface of the first reflective electrode away from the base substrate; and a common electrode layer covering a surface of the electrochromic layer away from the base substrate and a surface of the light-emitting unit away from the base substrate.

In an exemplary embodiment of the present disclosure, an amount of the second reflective electrode is multiple, and the first reflective electrode is formed with a plurality of hollowed-out first pixel windows in one-to-one correspondence with each of the second reflective electrodes, and any one of the second reflective electrodes is arranged in the corresponding first pixel window.

In an exemplary embodiment of the present disclosure, the first reflective electrode is an integrated structure.

In an exemplary embodiment of the present disclosure, a material of the electrochromic layer is a combination of one or more of tungsten oxide, molybdenum oxide, titanium oxide, vanadium oxide and niobium oxide, or a material of the electrochromic layer is a combination of one or more of nickel oxide, iridium oxide, cobalt oxide and rhodium oxide.

In an exemplary embodiment of the present disclosure, the array substrate further includes:

a pixel defining layer provided on a side of the driving circuit layer away from the base substrate, wherein the pixel defining layer is formed with a hollowed-out second pixel window, the second reflective electrode is arranged in the second pixel window, and the first reflective electrode covers a side of the pixel defining layer away from the base substrate.

In an exemplary embodiment of the present disclosure, the light-emitting unit is a light-emitting diode, and the array substrate further includes:

a passivation protection layer provided between the reflective electrode layer and the common electrode layer, wherein the passivation protection layer is formed with a hollowed-out third pixel window, and the light-emitting unit is embedded in the third pixel window.

According to a second aspect of the present disclosure, there is provided a method for preparing an array substrate, including:

providing a base substrate;

forming a driving circuit layer on a side of the base substrate, wherein the driving circuit layer is provided with a first driving circuit and a second driving circuit;

forming a reflective electrode layer on a side of the driving circuit layer away from the base substrate, wherein the reflective electrode layer is provided with a first reflective electrode and a second reflective electrode, the first reflective electrode is electrically connected to an output terminal of the first driving circuit and insulated from the second reflective electrode, and the second reflective electrode is electrically connected to an output terminal of the second driving circuit;

forming a light-emitting layer, wherein the light-emitting layer includes a light-emitting unit disposed on a surface of the second reflective electrode away from the base substrate;

forming an electrochromic layer, wherein the electrochromic layer covers a surface of the first reflective electrode away from the base substrate; and forming a common electrode layer, wherein the common electrode layer covers a surface of the electrochromic layer away from the base substrate and a surface of the light-emitting unit away from the base substrate.

According to a third aspect of the present disclosure, there is provided a display panel, including the array substrate descried above.

According to a fourth aspect of the present disclosure, there is provided a driving method of a display panel for driving the display panel described above, wherein the driving method of the display panel includes:

under a first situation, applying a first control signal to the first driving circuit, so that the first driving circuit applies a first control voltage to the first reflective electrode according to the first control signal; applying a first common voltage to the common electrode layer, so that a potential difference between the first reflective electrode and the common electrode layer is within a first preset range, so that the electrochromic layer is in a transparent state; and under a second situation, applying a second control signal to the first driving circuit, so that the first driving circuit applies a second control voltage to the first reflective electrode according to the second control signal; applying a second common voltage to the common electrode layer, so that a potential difference between the first reflective electrode and the common electrode layer is within a second preset range, so that the electrochromic layer is in an opaque state.

In the array substrate and the preparation method thereof, the display panel and the driving method thereof provided in the present disclosure, the light-emitting layer is arranged on a side of the reflective electrode layer away from the base substrate, so that the light emitted by the light-emitting unit can be emitted without passing through the reflective electrode layer, and the overall light transmittance is improved and the loss of emitted light is reduced. Not only that, the second reflective electrode can also reflect the light irradiated by the light-emitting unit toward the base substrate, thereby further increasing the proportion of emitted light. Therefore, the array substrate has higher light transmittance and higher light emitting rate, thereby improving the contrast of the display image, and reducing the luminous intensity of the light-emitting unit to reduce the power consumption of the array substrate. The array substrate is provided with an electrochromic layer between the first reflective electrode and the common electrode layer. The electrochromic layer can change its light transmission state in response to changes in the electromotive force between the first reflective electrode and the common electrode layer, for example, reversible conversion between the transparent state and the opaque state may be achieved. Therefore, the array substrate can independently control on and off of the mirror display function as needed, to adapt to different application scenarios and achieve better display effects.

BRIEF DESCRIPTION OF THE DRAWINGS

The above-mentioned and other features and advantages of the present disclosure will become more apparent by describing the exemplary embodiments thereof in detail with reference to the accompanying drawings.

DETAILED DESCRIPTION

Figure 1:
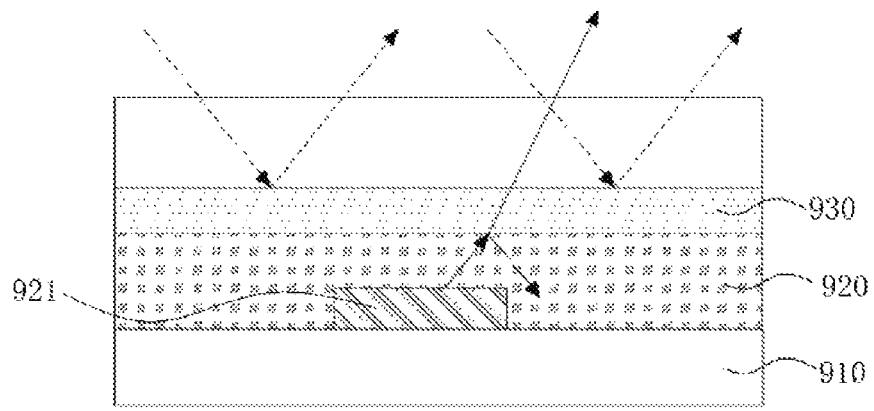
FIG. 1 is a schematic diagram of a structure of a mirror display panel in the prior art.

Example embodiments will now be described more fully with reference to the accompanying drawings. However, the example embodiments can be implemented in various forms, and should not be construed as being limited to the examples set forth herein; on the contrary, the provision of these embodiments makes the present disclosure more comprehensive and complete, and fully conveys the concept of the example embodiments to those skilled in the art. The described features, structures, or characteristics may be combined in one or more embodiments in any suitable manner. In the following description, many specific details are provided to give a sufficient understanding of the embodiments of the present disclosure.

In the figure, the thickness of regions and layers may be exaggerated for clarity. The same reference numerals in the figures indicate the same or similar structures, and thus their detailed descriptions will be omitted.

The described features, structures, or characteristics may be combined in one or more embodiments in any suitable manner. In the following description, many specific details are provided to give a sufficient understanding of the embodiments of the present disclosure. However, those skilled in the art will realize that the technical solutions of the present disclosure can be practiced without one or more of the specific details, or other methods, components, materials, etc. can be used. In other cases, well-known structures, materials, or operations are not shown or described in detail to avoid obscuring the main technical ideas of the present disclosure.

When a certain structure is "on" other structures, it may mean that the certain structure is integrally formed on other structures, or that the certain structure is "directly" arranged on other structures, or that the certain structure is "indirectly" arranged on other structures through another structure.

The terms "a", "an", and "the" are used to indicate the presence of one or more elements, components, etc. The terms "including" and "having" are used to indicate open-ended inclusion and mean that there may be additional elements, components, etc. in addition to the listed elements, components, etc. The terms "first" and "second" are only used as marks, and are not limited to the number of objects.

FIG. 1 is a schematic diagram of the structure of a mirror display panel in the related art. Referring to FIG. 1, in the related art, a mirror display panel includes a base substrate 910, a light-emitting layer 920, and a mirror reflection layer 930 that are sequentially stacked. The mirror reflection layer 930 adopts a high reflection film having light transmittance, and the reflectivity is generally around 50%. For example, the mirror reflection layer 930 may adopt a semi-transparent and semi-reflective film. In this way, the mirror reflection layer 930 of the mirror display panel can reflect ambient light (indicated by dotted lines in FIG. 1) to achieve a mirror display effect. The light-emitting layer 920 generally includes a plurality of light-emitting units 921, and the light emitted by the light-emitting units 921 passes through the mirror reflection layer 930 to achieve the image display. However, the light emitted by the light-emitting unit 921 will be partially reflected by the mirror reflection layer 930, resulting in high reflection loss, which causes a decrease in the overall light transmittance and reduces the light emitting rate and contrast of the mirror display panel. Not only that, the mirror display panel needs to increase the light-emitting brightness of the light-emitting unit 921, which may result in an increase in power consumption.

Figure 2:
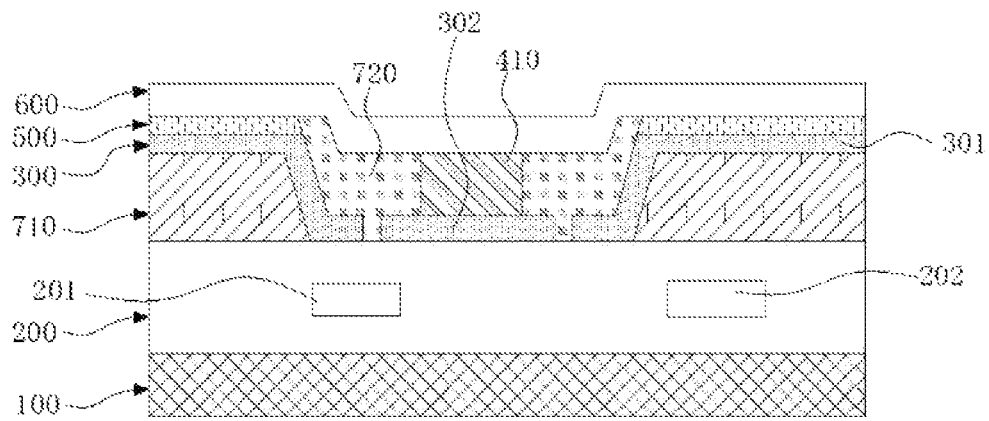
FIG. 2 is a schematic diagram of a structure of an array substrate according to an embodiment of the present disclosure.
Figure 3:
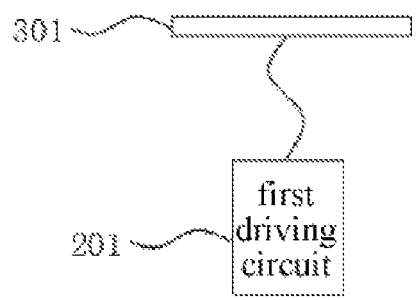
FIG. 3 is a schematic diagram of a connection relationship between the first driving circuit and the first reflective electrode according to the embodiment of the present disclosure.
Figure 4:
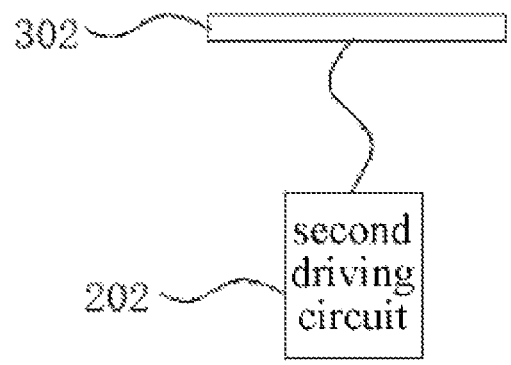
FIG. 4 is a schematic diagram of a connection relationship between the second driving circuit and the second reflective electrode according to the embodiment of the present disclosure.

The present disclosure provides an array substrate, as shown in FIGS. 2 to 4. The array substrate includes a base substrate 100, a driving circuit layer 200, a reflective electrode layer 300, a light-emitting layer, an electrochromic layer 500, and a common electrode layer 600.

In the embodiment, the driving circuit layer 200 is provided on a side of the base substrate 100. The driving circuit layer 200 is provided with a first driving circuit 201 and a second driving circuit 202. The reflective electrode layer 300 is provided on a side of the driving circuit layer 200 away from the base substrate 100. The reflective electrode layer 300 is provided with a first reflective electrode 301 and a second reflective electrode 302. The first reflective electrode 301 is electrically connected to an output terminal of the first driving circuit 201 and insulated from the second reflective electrode 302. The second reflective electrode 302 is electrically connected to an output terminal of the second driving circuit 202. The light-emitting layer includes a light-emitting unit 410 disposed on a surface of the second reflective electrode 302 away from the base substrate 100. The electrochromic layer 500 is provided on a surface of the first reflective electrode 301 away from the base substrate 101. The common electrode layer 600 covers a surface of the electrochromic layer 500 away from the base substrate 100 and a surface of the light-emitting unit 410 away from the base substrate 100.

The array substrate provided in the present disclosure is provided with a reflective electrode layer 300, which can reflect ambient light to achieve a mirror reflection function. In the array substrate, the light-emitting layer is arranged on a side of the reflective electrode layer 300 away from the base substrate 100, so that the light emitted by the light-emitting unit 410 can emit out without passing through the reflective electrode layer 300. The overall light transmittance is improved, and the loss of emitted light is reduced. Not only that, the second reflective electrode 302 can also reflect the light irradiated by the light-emitting unit 410 toward the base substrate 100, thereby further increasing the proportion of emitted light. Therefore, the array substrate of the present disclosure does not only avoid the loss of emitted light caused by the reflective electrode layer 300, but also increase the proportion of emitted light by means of the reflection function of the second reflective electrode 302. The array substrate has higher light transmittance and higher light emitting rate, thereby improving the contrast of the display image, and reducing the luminous intensity of the light-emitting unit 410 to reduce the power consumption of the array substrate.

The array substrate is provided with an electrochromic layer 500 between the first reflective electrode 301 and the common electrode layer 600. The electrochromic layer 500 can change its light transmission state in response to changes in the electromotive force between the first reflective electrode 301 and the common electrode layer 600, for example, reversible conversion between the transparent state and the opaque state may be achieved. When the array substrate does not need to perform as a mirror display, a voltage on the first reflective electrode 301 can be controlled by the first driving circuit 201 to make the electrochromic layer 500 in an opaque state, which prevents ambient light from irradiating the first reflective electrode 301, suppresses or eliminates the mirror display of the array substrate, avoids the influence of ambient light on the display image, and improves the contrast of the display image. Not only that, since there is no interference from ambient light, the array substrate does not need to increase the brightness of the light-emitting unit, in turn, the power consumption of the array substrate is reduced. When the array substrate needs to perform mirror display, the voltage on the first reflective electrode 301 can be controlled by the first driving circuit 201 to make the electrochromic layer 500 in a transparent state, so that ambient light can be irradiated to the first reflective electrode 301 and then be reflected, so that the array substrate realizes the mirror display. Therefore, the array substrate can independently control the on and off of the mirror display function according to requirements to adapt to different application scenarios and achieve better display effects.

Hereinafter, in conjunction with specific drawings, the structure, principles, and effect of the array substrate of the present disclosure will be further explained and described.

The base substrate 100 may be a base substrate 100 of an inorganic material or a base substrate 100 of an organic material. For example, in an embodiment of the present disclosure, the material of the base substrate 100 may be soda-lime glass, quartz glass, sapphire glass, or other glass materials, or may be stainless steel, aluminum, nickel, or other metallic materials. In another embodiment of the present disclosure, the material of the base substrate 100 may be polymethyl methacrylate (PMMA), polyvinyl alcohol (PVA), or polyvinyl phenol (PVP), polyether sulfone (PES), polyimide, polyamide, polyacetal, poly carbonate (PC), polyethylene terephthalate (PET), polyethylene naphthalate (PEN) or a combination thereof. In another embodiment of the present disclosure, the base substrate 100 may also be a flexible base substrate 100. For example, the material of the base substrate 100 may be polyimide (PI). The base substrate 100 may also be a composite of multiple layers of materials. For example, in an embodiment of the present disclosure, the base substrate 100 may include a bottom film layer, a pressure-sensitive adhesive layer, a first polyimide layer and the second polyimide layer that are sequentially stacked.

The driving circuit layer 200 is disposed on one side of the base substrate 100, and it may adopt an active driving structure or a passive driving structure, or a combination of an active driving structure and a passive driving structure. As shown in FIGS. 2 and 3, the driving circuit layer 200 may be provided with a first driving circuit 201, and the first driving circuit 201 is used to control the voltage on the first reflective electrode 301.

In an embodiment of the present disclosure, the first driving circuit 201 may be a connecting lead. One end of the connecting lead may be connected to the first reflective electrode 301, and the other end of the connecting lead may be connected to a driving pad. The driving pad is used to be electrically connected to the driver. In this way, the driver can apply the required voltage to the driving pad, and apply the required voltage to the first reflective electrode 301 through the driving pad and the connecting lead, which can realize the passive driving of the first reflective electrode 301.

Figure 5:
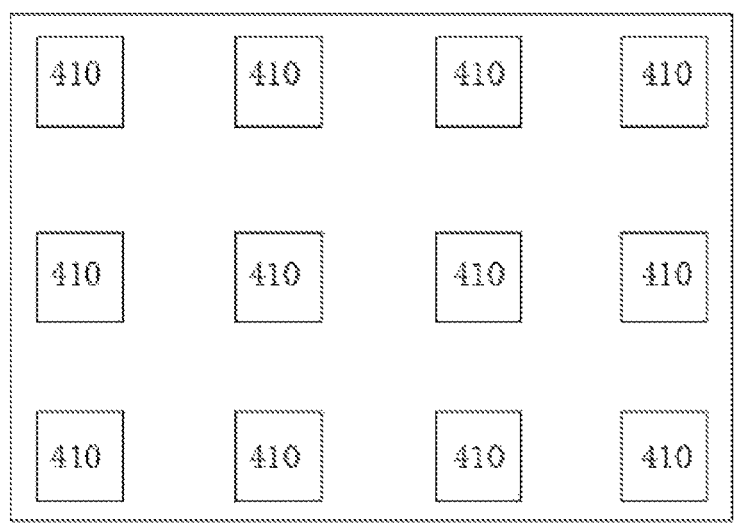
FIG. 5 is a display effect diagram when the electrochromic layer is in a transparent state according to the embodiment of the present disclosure.

For example, the driver can apply the first control signal to the connecting lead through the driving pad, and the voltage of the first control signal is the first control voltage. In this way, the connecting lead can apply the first control voltage to the first reflective electrode 301. In other words, the driver may apply the first control signal to the first driving circuit 201, so that the first driving circuit 201 applies the first control voltage to the first reflective electrode 301 according to the first control signal. The driver can also apply a first common voltage to the common electrode layer 600, so that the potential difference between the first reflective electrode 301 and the common electrode layer 600 is within a first preset range, thereby making the electrochromic layer 500 in a transparent state. At this time, the display effect of the array substrate is shown in FIG. 5. Referring to FIG. 5, in the surrounding area of each light-emitting unit 410, the electrochromic layer 500 is in a transparent state, so that the array substrate can reflect the ambient light.

Figure 6:
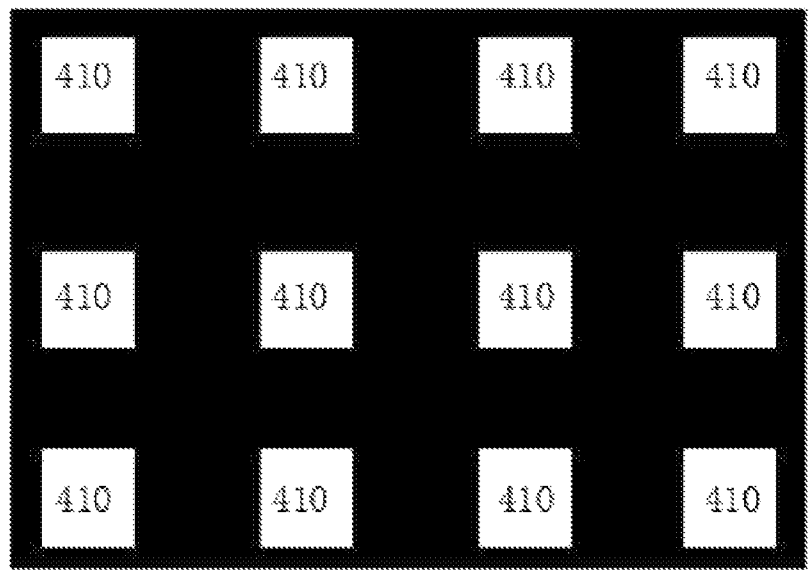
FIG. 6 is a display effect diagram when the electrochromic layer is in an opaque state according to the embodiment of the present disclosure.

For another example, the driver can apply the second control signal to the connecting lead through the driving pad, and the voltage of the second control signal is the second control voltage. In this way, the connecting lead can apply the second control voltage to the first reflective electrode 301. In other words, the driver may apply the first control signal to the first driving circuit 201, so that the first driving circuit 201 applies the first control voltage to the first reflective electrode 301 according to the first control signal. The driver may also apply a second common voltage to the common electrode layer 600, so that the potential difference between the first reflective electrode 301 and the common electrode layer 600 is within a second preset range, thereby making the electrochromic layer 500 in an opaque state. At this time, the display effect of the array substrate is shown in FIG. 6. Referring to FIG. 6, in the surrounding area of each light-emitting unit 410, the electrochromic layer 500 is in an opaque state, so that the array substrate cannot reflect the ambient light.

In another embodiment of the present disclosure, the first driving circuit 201 may be a circuit composed of electronic components. For example, the first driving circuit 201 may include a lead wire and a thin film transistor connected to the lead wire, so as to control the voltage on the first reflective electrode 301 through active driving. It is understandable that a storage capacitor may also be provided on the first driving circuit 201.

Figure 7:
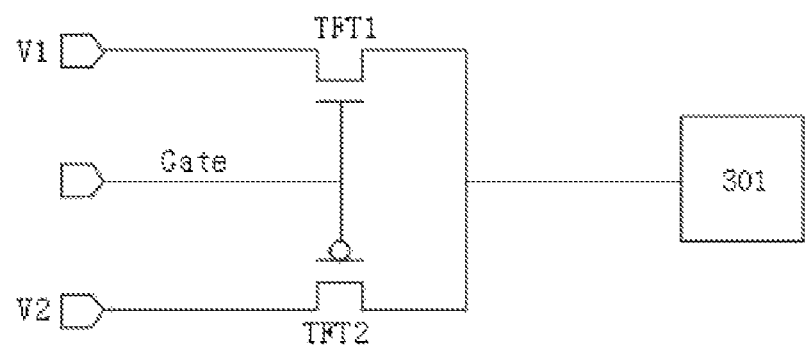
FIG. 7 is an equivalent circuit diagram of the first driving circuit of an embodiment of the present disclosure.

For example, as shown in FIG. 7, the first driving circuit 201 may include a first thin film transistor TFT1 and a second thin film transistor TFT2. In the embodiment, one of the first thin film transistor TFT1 and the second thin film transistor TFT2 is an N-type thin film transistor, and the other is a P-type thin film transistor. The first thin film transistor TFT1 can be turned on under the control of the first control signal and turned off under the control of the second control signal, and the second thin film transistor TFT2 can be turned on under the control of the second control signal and turned off under the control of the first control signal. The input terminal of the first thin film transistor TFT1 is used to load the first control voltage V1, the output terminal of the first thin film transistor TFT1 is electrically connected to the first reflective electrode 301, and the control terminal of the first thin film transistor TFT1 is electrically connected to a control lead Gate. The input terminal of the second thin film transistor TFT2 is used to load the second control voltage V2, the output terminal of the second thin film transistor TFT2 is electrically connected to the first reflective electrode 301, and the control terminal of the second thin film transistor TFT2 is electrically connected to the control lead Gate.

When the first control signal is applied to the control lead Gate, the first thin film transistor TFT1 is turned on and the second thin film transistor TFT2 is turned off, and the first control voltage V1 is applied to the first reflective electrode 301 through the first thin film transistor TFT1. When the second control signal is applied to the control lead Gate, the second thin film transistor TFT2 is turned on and the first thin film transistor TFT1 is turned off, and the second control voltage V2 is applied to the first reflective electrode 301 through the second thin film transistor TFT2.

Optionally, the input terminal of the first thin film transistor TFT1 may be used to load the first power supply voltage (VDD) as the first control voltage, that is, the input terminal of the first thin film transistor TFT1 may be electrically connected to the power lead of the array substrate.

Optionally, the first driving circuit 201 may also be provided with a voltage divider circuit, and the input terminal of the voltage divider circuit is used to load the first power supply voltage (VDD), that is, the input terminal of the voltage divider circuit may be electrically connected to the power lead of the array substrate. The output terminal of the voltage divider circuit can be electrically connected to the input terminal of the first thin film transistor TFT1. In this way, a certain voltage can be obtained through the voltage divider circuit, for example, 0.5VDD (half of the first power supply voltage) can be obtained as the first control voltage.

Optionally, the input terminal of the second thin film transistor TFT2 may be electrically connected to the common electrode layer 600. In this way, the second control voltage may be the same as the voltage on the common electrode layer 600, that is, both of them are the second power supply voltage (VSS).

As shown in FIG. 4, the second driving circuit 202 is used to apply a required current or voltage to the second reflective electrode 302, to drive the light-emitting unit 410 to emit light. In an embodiment of the present disclosure, the second driving circuit 202 may be an active driving circuit, which may be provided with a thin film transistor. Optionally, the second driving circuit 202 may also be provided with electronic components such as storage capacitors. The thin film transistor may be LTPS-TFT (low temperature polysilicon-thin film transistor) or Oxide-TFT (oxide-thin film transistor), for example, IGZO-TFT, which is not limited in the present disclosure. The thin film transistor may be of a top gate type or a bottom gate type, which is not limited in the present disclosure.

Optionally, when the light-emitting layer is provided with a plurality of light-emitting units 410, the reflective electrode layer may be provided with a plurality of second reflective electrodes 302 in one-to-one correspondence with each light-emitting unit 410, wherein any one of the light-emitting units 410 is provided on a surface of the corresponding second reflective electrode 302 away from the base substrate 100. The driving circuit layer is provided with a plurality of second driving circuits 202, and the output terminal of each second driving circuit 202 is electrically connected to each second reflective electrode 302 in one-to-one correspondence. In this way, the plurality of second driving circuits 202 drive the plurality of light-emitting units 410 in one-to-one correspondence, so that each light-emitting unit 410 can emit light independently and controllably.

The second driving circuit 202 can be selected and determined according to the type of the light-emitting unit 410 and the performance requirements of the array substrate. For example, when the light-emitting unit 410 is an LED (light-emitting diode), a micro LED, an OLED (organic light-emitting diode), etc., the second driving circuit 202 may select a driving circuit for outputting a driving current. When the light-emitting unit 410 is a liquid crystal cell or the like, the second driving circuit 202 may select a driving circuit for outputting a driving voltage.

Below, a specific implementation manner of the second driving circuit 202 is exemplarily provided to further exemplify the structure and principle of the second driving circuit 202.

Figure 8:
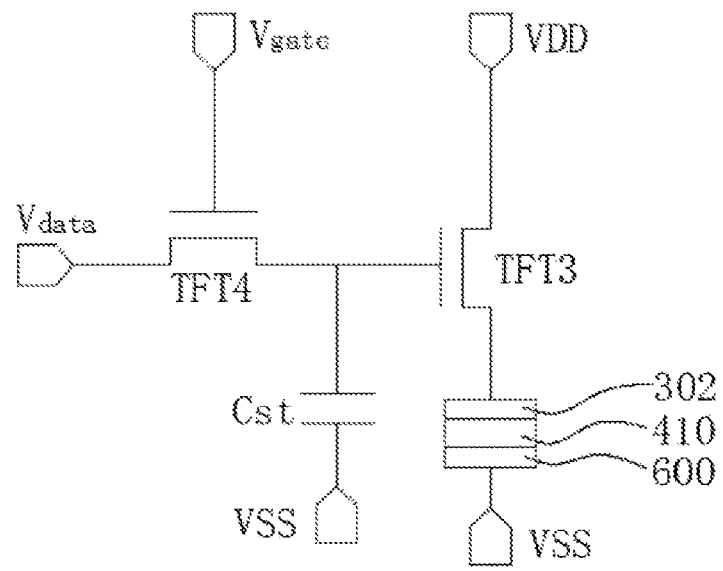
FIG. 8 is an equivalent circuit diagram of a second driving circuit according to an embodiment of the present disclosure.

As shown in FIG. 8, the exemplary second driving circuit 202 may be a 2T1C (two thin film transistors and one storage capacitor) architecture, which includes a driving transistor TFT3, a data writing transistor TFT4 and a storage capacitor Cst. The driven light-emitting unit 410 may be a micro LED. The input terminal (source) of the driving transistor TFT3 is used to load the first power supply voltage (VDD), the output terminal (drain) of the driving transistor TFT3 is used to connect the second reflective electrode 302, and the control terminal (gate) of the driving transistor TFT3 is electrically connected to the first electrode of the storage capacitor Cst. The input terminal (source) of the data writing transistor TFT4 is used to load the data voltage signal $V_{data}$, the output terminal (drain) of the data writing transistor TFT4 is electrically connected to the first electrode of the storage capacitor Cst, and the control terminal (gate) of the data writing transistor TFT4 is used to load the scan signal $V_{gate}$. The second electrode of the storage capacitor Cst is used to load the second power supply voltage (VSS). The light-emitting unit 410 is disposed between the second reflective electrode 302 and the common electrode layer 600, and the common electrode layer 600 is also applied with a second power supply voltage (VSS).

In a charging phase, the scan lead applies the scan signal $V_{gate}$ to the control terminal of the data writing transistor TFT4, so that the data writing transistor TFT4 is turned on. The data lead applies the data voltage signal $V_{data}$ to the input terminal of the data writing transistor TFT4, so that the data voltage signal $V_{data}$ is applied to the first electrode of the storage capacitor Cst and written into the storage capacitor Cst. Since the first electrode of the storage capacitor Cst is electrically connected to the control terminal of the driving transistor TFT3, the driving transistor TFT3 can output a driving current under the control of the voltage on the first electrode of the storage capacitor Cst. The driving current passes through the second reflective electrode 302 and the light-emitting unit 410 (micro LED) and flows to the common electrode layer 600, and the light-emitting unit 410 emits light under the driving of the driving current. In a light-emission maintaining phase, after the scan wire is no longer loaded with the scan signal $V_{gate}$, the data writing transistor TFT4 is turned off, so the storage capacitor Cst can maintain the voltage on its first electrode unchanged, so that the driving transistor TFT3 can continuously output the driving current, and the light-emitting unit 410 continuously emits light.

It is understandable that the driving circuit of the 2T1C architecture described above is only an example of the second driving circuit 202. In other cases, the second driving circuit 202 may also have other circuit structures. For example, the second driving circuit 202 may adopt a 5T1C architecture, 6T1C architecture, 7T1C architecture, 4T2C architecture, 5T2C architecture, etc., which will not be described in this disclosure in detail.

The reflective electrode layer 300 is provided with a first reflective electrode 301. The first reflective electrode 301, the electrochromic layer 500 and the common electrode layer 600 constitute a mirror reflective device controlled by the first driving circuit 201.

In the first situation, a first control signal may be applied to the first driving circuit 201, so that the first driving circuit 201 applies a first control voltage to the first reflective electrode 301 according to the first control signal. A first common voltage is applied to the common electrode layer 600, so that a potential difference between the first reflective electrode 301 and the common electrode layer 600 is within a first preset range, so that the electrochromic layer 500 is in a transparent state. Referring to FIG. 5, in the first situation, since the electrochromic layer 500 is in a transparent state, the ambient light can be irradiated to the first reflective electrode 301 and reflected by the first reflective electrode 301, thereby making the array substrate have a mirror display function.

In a second situation, a second control signal may be applied to the first driving circuit 201, so that the first driving circuit 201 applies a second control voltage to the first reflective electrode 301 according to the second control signal. A second common voltage is applied to the common electrode layer 600, so that a potential difference between the first reflective electrode 301 and the common electrode layer 600 is within a second preset range, so that the electrochromic layer 500 is in an opaque state. Referring to FIG. 6, in the second situation, since the electrochromic layer 500 is in an opaque state, ambient light cannot be irradiated to the first reflective electrode 301, and cannot be reflected by the first reflective electrode 301, which can suppress or eliminate the mirror reflection function of the array substrate, avoid the influence of the ambient light reflected by the array substrate on the display image, and improve the contrast of the image displayed by the array substrate.

Optionally, the first common voltage and the second common voltage may be the same or different.

The reflective electrode layer 300 is provided with a first reflective electrode 301 and a second reflective electrode 302 that are insulated from each other, to ensure that the image display function and the mirror display function of the array substrate are independent of each other.

Figure 9:
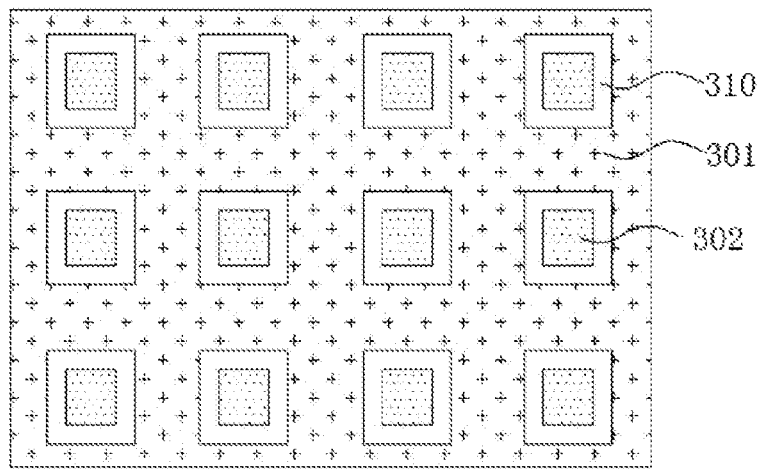
FIG. 9 is a schematic top view of a reflective electrode layer according to an embodiment of the present disclosure.

In an embodiment of the present disclosure, as shown in FIG. 9, an amount of the second reflective electrode 302 is multiple, and the first reflective electrode 301 may be formed with a plurality of hollowed-out first pixel windows 310 in one-to-one correspondence with each of the second reflective electrodes 302, and any one of the second reflective electrodes 302 is arranged in the corresponding first pixel window 310. In this way, the first reflective electrode 301 is arranged between any two second reflective electrodes 302, which can increase the area of the first reflective electrode 301, thereby ensuring that the array substrate has better mirror reflection ability.

The distance between the second reflective electrode 302 and the first reflective electrode 301 can be determined according to process requirements, pixel density, and the like. In an embodiment of the present disclosure, the distance between any one of the second reflective electrodes 302 and the first reflective electrode 301 is 1-10 microns, which can increase the area of the first reflective electrode 301, increase the area ratio of the reflective electrode layer 300 with respect to the entire array substrate, and improve the mirror display effect of the array substrate, on the premise of guaranteeing the effective insulation between the second reflective electrode 302 and the first reflective electrode 301. In some embodiments, the distance between any one of the second reflective electrodes 302 and the first reflective electrode 301 is 2-5 microns.

In an embodiment of the present disclosure, as shown in FIG. 9, the first reflective electrode 301 may be an integral structure, that is, any two positions of the first reflective electrode 301 are electrically connected to each other. In this way, the area of the first reflective electrode 301 can be increased, and the entire first reflective electrode 301 can be controlled by one first driving circuit 201, which simplifies the driving circuit layer 200 of the array substrate and the control method.

It can be understood that, in other implementations of the present disclosure, the first reflective electrode 301 may also be divided into a plurality of unconnected parts. Different parts of the first reflective electrode 301 may be connected to the output terminal of the same first driving circuit 201 at the same time, or they may be electrically connected to the output terminals of different first driving circuits 201 respectively.

As shown in FIG. 9, a plurality of second reflective electrodes 302 are distributed in an array. Referring to FIGS. 4 and 8, any second reflective electrode 302 can be used as a pixel electrode to cooperate with the corresponding light-emitting unit 410, to drive the light-emitting unit 410 to emit light. In the embodiment, each second reflective electrode 302 is electrically connected to each second driving circuit 202 in one-to-one correspondence, so that each light-emitting unit 410 can be independently controlled by each second driving circuit 202 in one-to-one correspondence.

The material and thickness of the first reflective electrode 301 and the second reflective electrode 302 may be the same, so that the first reflective electrode 301 and the second reflective electrode 302 can be prepared in the same process simultaneously. For example, in an embodiment of the present disclosure, the reflective electrode layer 300 may be prepared by the following method.

A reflective electrode material layer is formed on the side of the driving circuit layer 200 away from the base substrate 100; then the reflective electrode material layer is patterned to form a reflective electrode layer 300, and the reflective electrode layer 300 is formed with a first reflective electrode 301 and a second reflective electrode 302.

Optionally, the reflective electrode layer 300 should have a good reflective ability to ensure the reflective ability of the reflective electrode layer 300, thereby ensuring the mirror display effect of the array substrate. Optionally, the reflectivity of the reflective electrode layer 300 is not less than 90%. In some embodiments, the reflectivity of the reflective electrode layer 300 is not less than 95%. In this way, it can ensure that the reflective electrode layer 300, especially the second reflective electrode 302, has a high reflectivity.

Optionally, the reflective electrode layer 300 is made of materials with good electrical conductivity, for example, metals, alloys, and other materials.

In an embodiment of the present disclosure, the material of the reflective electrode layer 300 may be a combination of one or more of silver, aluminum, molybdenum, titanium, and the like.

The light-emitting unit 410 can be an electroluminescent device such as LED, Micro LED, OLED, PLED, or other electroluminescent devices. Since the liquid crystal unit can be used to control whether light from the backlight source passes through and the intensity of the light passing through, the liquid crystal unit can also be regarded as the light-emitting unit 410 of the present disclosure.

In the present disclosure, the light-emitting unit 410 may be composed of anode and cathode electrodes and a functional layer disposed between the anode and cathode electrodes, or it may also only include the functional layer, and the second reflective electrode 302 and the common electrode layer 600 are used as anode and cathode electrodes.

For example, in an embodiment of the present disclosure, the light-emitting unit 410 may be a Micro LED, and two ends of the Micro LED are connected to the second reflective electrode 302 and the common electrode layer 600, respectively. The LED includes a plurality of layers of stacked inorganic semiconductor layers to form a PN junction surface contact diode. One of the second reflective electrode 302 and the common electrode layer 600 serves as an anode, and the other serves as a cathode. When a forward bias is applied between the anode and the cathode, the current flows from the anode to the cathode through the Micro LED, and electrons and holes recombine in the active area of the Micro LED, making the Micro LED emit monochromatic light. Optionally, the thickness of the Micro LED is 3 to 5 microns.

Optionally, the light-emitting unit 410 in the array substrate includes a red light-emitting unit 410, a green light-emitting unit 410 and a blue light-emitting unit 410. Exemplarily, the red light-emitting unit 410 may include an AlGaAs layer, a GaAsP layer, an AlGaInP layer, and a GaP layer sequentially stacked on the surface of the second reflective electrode 302 away from the base substrate 100. The surface of the GaP layer away from the base substrate 100 is electrically connected to the common electrode layer 600. Exemplarily, the green light-emitting unit 410 may include an InGaN layer, a GaN layer, a GaP layer, an AlGaInP layer and an AlGaP layer sequentially stacked on the surface of the second reflective electrode 302 away from the base substrate 100. The surface of the AlGaP layer away from the base substrate 100 is electrically connected to the common electrode layer 600. Exemplarily, the blue light-emitting unit 410 may include a GaN layer, an InGaN layer and a ZnSe layer that are sequentially stacked on the surface of the second reflective electrode 302 away from the base substrate 100. The surface of the ZnSe layer away from the base substrate 100 is electrically connected to the common electrode layer 600.

Optionally, when the light-emitting unit 410 is a micro LED, each micro LED may be transferred to the corresponding second reflective electrode 302 through the mass transfer technology.

The electrochromic layer 500 can reversibly change its color or transparency under the change of the potential difference between the first reflective electrode 301 and the common electrode layer 600. In the first situation, the potential difference between the first reflective electrode 301 and the common electrode layer 600 is within the first preset range, and the electrochromic layer 500 is in a transparent state. In the second situation, the electric potential difference between the first reflective electrode 301 and the common electrode layer 600 is within the second preset range, and the electrochromic layer 500 is in an opaque state.

The material of the electrochromic layer 500 may be an organic material or an inorganic material. In an embodiment of the present disclosure, the electrochromic layer 500 may use a metal oxide or a mixture of a plurality of metal oxides. For example, in an embodiment of the present disclosure, the material of the electrochromic layer 500 is a combination of one or more of tungsten oxide, molybdenum oxide, titanium oxide, vanadium oxide, and niobium oxide. For another example, in another embodiment of the present disclosure, the material of the electrochromic layer 500 is a combination of one or more of nickel oxide, iridium oxide, cobalt oxide, and rhodium oxide. Exemplarily, the material of the electrochromic layer 500 may be tungsten oxide.

The common electrode layer 600 is a transparent conductive electrode, so that the light emitted from the light-emitting unit 410 can emit out by passing through the common electrode layer 600, and the ambient light can pass through the common electrode layer 600 to realize the mirror display of the array substrate. The material of the common electrode layer 600 may be a-Si (a-polysilicon), ITO (indium tin oxide), IZO (indium zinc oxide), carbon nanotubes and other transparent conductive materials. In an embodiment of the present disclosure, the material of the common electrode layer 600 is ITO.

As shown in FIG. 2, the array substrate provided by the present disclosure may further include a pixel defining layer 710, and the pixel defining layer 710 is provided on the side of the driving circuit layer 200 away from the base substrate 100.

Figure 10:
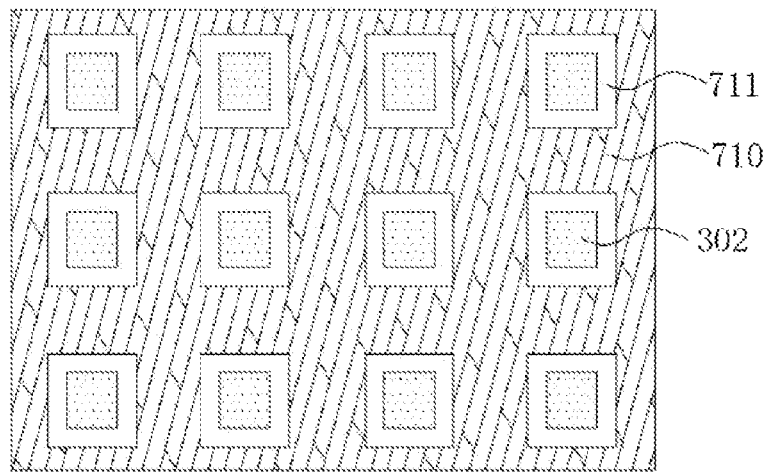
FIG. 10 is a schematic top view of a pixel defining layer and a second reflective electrode according to an embodiment of the present disclosure.

In an embodiment of the present disclosure, the light-emitting unit 410 may be a Micro LED. As shown in FIGS. 2 and 10, the pixel defining layer 710 is formed with a plurality of hollowed-out second pixel windows 711 in one-to-one correspondence with each second reflective electrode 302, and any one of the second reflective electrodes 302 is provided in the corresponding second pixel window 711. That is, the second pixel window 711 exposes the corresponding second reflective electrode 302. The first reflective electrode 301 is disposed on the side of the pixel defining layer 710 away from the base substrate 100. In this way, the pixel defining layer 710 may be formed with a second pixel window 711 for docking with the Micro LED which serves as the light-emitting unit 410.

Optionally, the thickness of the pixel defining layer 710 can be determined according to the thickness of the Micro LED, so that the second pixel window 711 can accommodate each Micro LED. In an embodiment of the present disclosure, the thickness of the pixel defining layer 710 is not less than the thickness of the Micro LED.

Optionally, the material of the pixel defining layer 710 may be a black material.

Optionally, after the pixel defining layer 710 is formed, a reflective electrode material layer covering a side of the pixel defining layer 710 away from the base substrate 100 can be formed by sputtering or evaporation or the like, and then the reflective electrode material layer is patterned, and in turn, the first reflective electrode 301 is obtained and each second reflective electrode 302 located in each second pixel window 711 in one-to-one correspondence is formed.

When the light-emitting unit 410 is another type of light-emitting device, such as an OLED or PLED, the second pixel window 711 of the pixel defining layer 710 may be used to define the light-emitting area of the light-emitting unit 410. For example, the second reflective electrode 302 may be formed on the side of the driving circuit layer 200 away from the base substrate 100 first, and then the pixel defining layer 710 may be formed on the side of the second reflective electrode 302 away from the base substrate 100. The second pixel window 711 of the pixel defining layer 710 exposes each second reflective electrode 302 or exposes a part of the second reflective electrodes 302.

Figure 11:
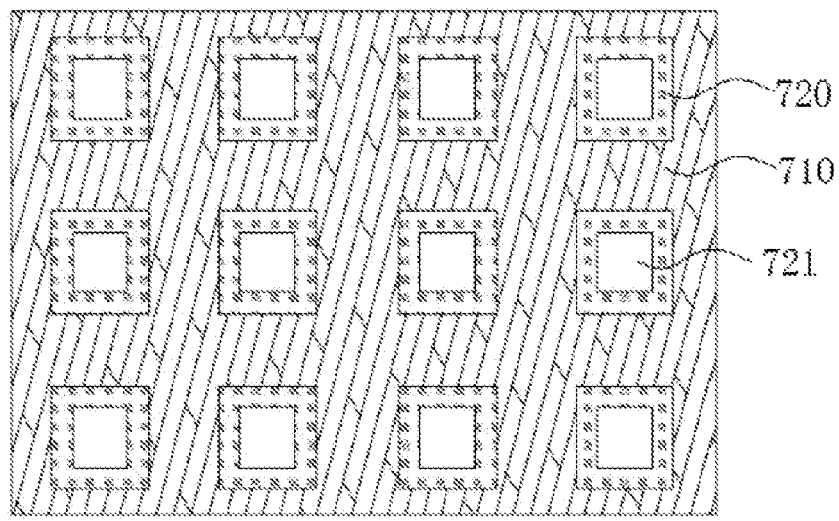
FIG. 11 is a schematic top view of a pixel defining layer and a passivation protection layer according to an embodiment of the present disclosure.

As shown in FIGS. 2 and 11, the array substrate of the present disclosure may further include a passivation protection layer 720. The passivation protection layer 720 is disposed between the reflective electrode layer 300 and the common electrode layer 600. The passivation protection layer 720 is formed with a plurality of hollowed-out third pixel windows 721 in one-to-one correspondence with each light-emitting unit 410, and any light-emitting unit 410 is embedded in the corresponding third pixel window 721. In this way, when the light-emitting unit 410 is a micro LED, the passivation protection layer 720 will surround the Micro LED so as to prevent short-circuit of the common electrode layer 600 and other film layers (for example, each quantum well layer) of the micro LED, and avoid short-circuit of the common electrode layer 600 and the reflective electrode layer 300.

The material of the passivation protection layer 720 may be an organic insulating material or an inorganic insulating material. For example, in an embodiment of the present disclosure, the material of the passivation protection layer 720 may be PMMA (polymethyl methacrylate) or PI (polyimide).

Optionally, after the massive transfer of the Micro LEDs is completed, each passivation protection layer 720 surrounding each Micro LED can be formed, so that each Micro LED only exposes the surface of the film layer away from the base substrate 100, without exposing other film layers, which avoids the short-circuit of other film layers and the common electrode when the common electrode layer 600 is formed. It can be understood that the portion of the second reflective electrode 302 not covered by the Micro LED may be covered by the passivation protection layer 720, to prevent the common electrode layer 600 and the second reflective electrode 302 from being short-circuited.

In an embodiment of the present disclosure, the array substrate of the present disclosure may further include an encapsulation layer, and the encapsulation layer covers the side of the common electrode layer 600 away from the base substrate 100, to protect the common electrode layer 600.

In an embodiment of the present disclosure, the array substrate of the present disclosure may further include a touch layer, and the touch layer is disposed on a side of the common electrode layer 600 away from the base substrate 100 to realize touch control of the array substrate. In some embodiments, the driving circuit layer 200 is further provided with a third driving circuit, and the third driving circuit is electrically connected to the touch layer and used for driving the touch layer.

In an embodiment of the present disclosure, the array substrate of the present disclosure may further include a fingerprint identification layer, which is provided on the side of the common electrode layer 600 away from the base substrate 100 to realize fingerprint identification. In some embodiments, the driving circuit layer 200 is further provided with a fourth driving circuit, which is electrically connected to the fingerprint recognition layer and used to drive the fingerprint recognition layer.

Figure 12:
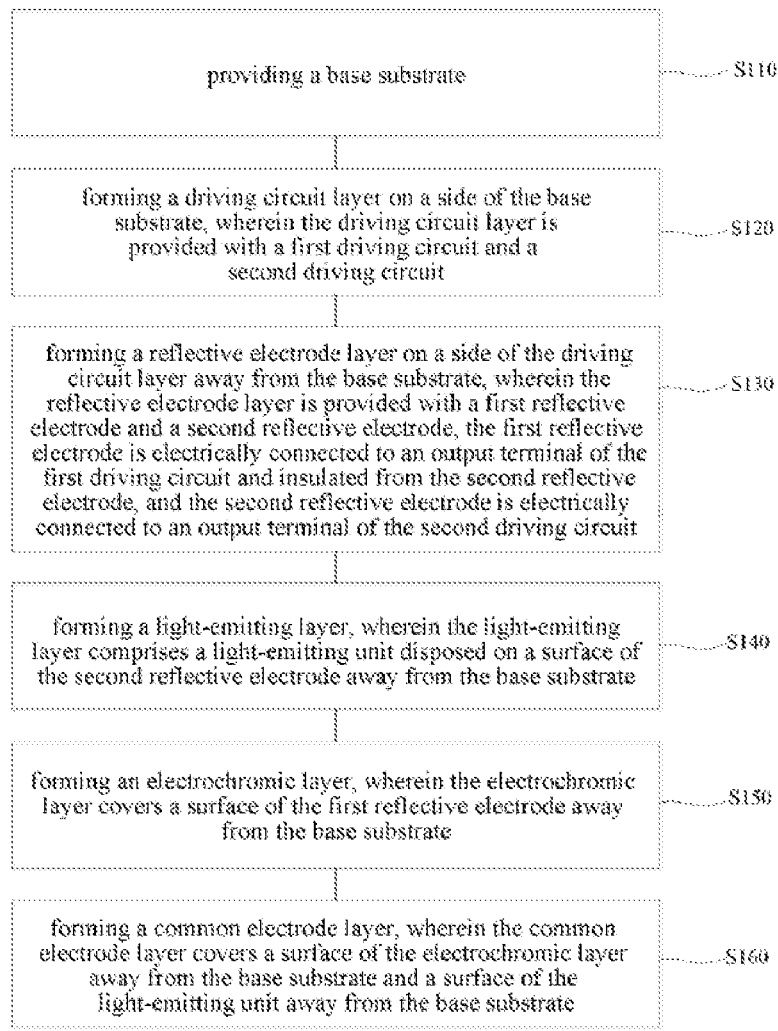
FIG. 12 is a schematic flow chart of a preparation method of an array substrate according to an embodiment of the present disclosure.

The present disclosure also provides a method for preparing the array substrate. As shown in FIG. 12, the method for preparing the array substrate includes:

step S110, providing a base substrate 100;

step S120, forming a driving circuit layer 200 on a side of the base substrate 100, wherein the driving circuit layer 200 is provided with a first driving circuit 201 and a second driving circuit 202;

step S130, forming a reflective electrode layer 300 on a side of the driving circuit layer 200 away from the base substrate 100, wherein the reflective electrode layer 300 is provided with a first reflective electrode 301 and a second reflective electrode 302, the first reflective electrode 301 is electrically connected to an output terminal of the first driving circuit 201 and insulated from the second reflective electrode 302, and the second reflective electrode 302 is electrically connected to an output terminal of the second driving circuit 202;

step S140, forming a light-emitting layer, wherein the light-emitting layer includes a light-emitting unit 410 disposed on a surface of the second reflective electrode 302 away from the base substrate 100;

step S150, forming an electrochromic layer 500, wherein the electrochromic layer 500 covers a surface of the first reflective electrode 301 away from the base substrate 100; and step S160, forming a common electrode layer 600, wherein the common electrode layer 600 covers a surface of the electrochromic layer 500 away from the base substrate 100 and a surface of the light-emitting unit 410 away from the base substrate 100.

The preparation method of the array substrate provided in the present disclosure can prepare any of the array substrates provided in the above-mentioned array substrate embodiments. The principle, effect and detail of the preparation method are described in detail in the above-mentioned array substrate embodiments, or they may be reasonably deduced based on the description in the above-mentioned array substrates, which is not repeated in the present disclosure.

It should be noted that although various steps of the method in the present disclosure are described in a specific order in the drawings, this does not require or imply that these steps must be performed in the specific order, or that all the steps shown must be performed to achieve the desired result. Additionally or alternatively, certain steps may be omitted, multiple steps may be combined into one step to be executed, and/or one step may be decomposed into multiple steps to be executed, etc., which all should be regarded as a part of the present disclosure.

The embodiments of the present disclosure also provide a display panel, which includes any of the array substrates described in the above-mentioned array substrate embodiments. The display panel may be an OLED display panel, a PLED display panel, a Micro LED display panel, or other types of display panels. Since the display panel has any of the array substrates described in the above-mentioned array substrate embodiments, it has the same beneficial effects, which will not be repeated in this disclosure.

The present disclosure also provides a driving method of a display panel, which is used to drive any one of the display panels described in the foregoing display panel embodiments. The driving method of the display panel includes following steps.

In the first situation, a first control signal is applied to the first driving circuit 201, so that the first driving circuit 201 applies a first control voltage to the first reflective electrode 301 according to the first control signal. A first common voltage is applied to the common electrode layer 600, so that a potential difference between the first reflective electrode 301 and the common electrode layer 600 is within a first preset range, so that the electrochromic layer 500 is in a transparent state. In this way, in the first situation, since the electrochromic layer 500 is in a transparent state, ambient light can be irradiated to the first reflective electrode 301 and reflected by the first reflective electrode 301, thereby making the array substrate have a mirror display function.

In a second situation, a second control signal is applied to the first driving circuit 201, so that the first driving circuit 201 applies a second control voltage to the first reflective electrode 301 according to the second control signal. A second common voltage is applied to the common electrode layer 600, so that a potential difference between the first reflective electrode 301 and the common electrode layer 600 is within a second preset range, so that the electrochromic layer 500 is in an opaque state. In this way, in the second situation, since the electrochromic layer 500 is in an opaque state, ambient light cannot be irradiated to the first reflective electrode 301, and cannot be reflected by the first reflective electrode 301, which can suppress or eliminate the mirror reflection function of the array substrate, avoid the influence of the ambient light reflected by the array substrate on the display image, and improve the contrast of the image displayed by the array substrate.

The principle, detail, and effect of the driving method are described and introduced in detail in the above-mentioned implementation of the array substrate, which will not be repeated in this disclosure.

It should be understood that the present disclosure does not limit its application to the detailed structure and arrangement of components proposed in this specification. The present disclosure can have other embodiments, and can be implemented and executed in various ways. The aforementioned deformations and modifications fall within the scope of the present disclosure. It should be understood that the present disclosure disclosed and defined in this specification extends to all alternative combinations of two or more individual features mentioned or well-understood in the text and/or drawings. All these different combinations constitute multiple alternative aspects of the present disclosure. The embodiments of the present specification illustrate the best way known for implementing the present disclosure, and will enable those skilled in the art to utilize the present disclosure.

What is claimed is:

1. An array substrate, comprising:
a base substrate;
a driving circuit layer provided on a side of the base substrate, wherein the driving circuit layer is provided with a first driving circuit and a second driving circuit;
a reflective electrode layer provided on a side of the driving circuit layer away from the base substrate, wherein the reflective electrode layer is provided with a first reflective electrode and a second reflective electrode, the first reflective electrode is electrically connected to an output terminal of the first driving circuit and insulated from the second reflective electrode, and the second reflective electrode is electrically connected to an output terminal of the second driving circuit;
a light-emitting layer comprising a light-emitting unit disposed on a surface of the second reflective electrode away from the base substrate;
an electrochromic layer provided on a surface of the first reflective electrode away from the base substrate; and
a common electrode layer covering a surface of the electrochromic layer away from the base substrate and a surface of the light-emitting unit away from the base substrate, wherein the array substrate further comprises a pixel defining layer provided on a side of the driving circuit layer away from the base substrate, wherein the pixel defining layer is formed with a hollowed-out second pixel window, the second reflective electrode is arranged in the second pixel window, and the first reflective electrode covers a side of the pixel defining layer away from the base substrate, and wherein the light-emitting unit is a light-emitting diode, and the array substrate further comprises a passivation protection layer provided between the reflective electrode layer and the common electrode layer, wherein the passivation protection layer is formed with a hollowed-out third pixel window, and the light-emitting unit is embedded in the third pixel window.

2. The array substrate according to claim 1, wherein an amount of the second reflective electrode is multiple, and the first reflective electrode is formed with a plurality of hollowed-out first pixel windows in one-to-one correspondence with each of the second reflective electrodes, and any one of the second reflective electrodes is arranged in the corresponding first pixel window.

3. The array substrate according to claim 1, wherein the first reflective electrode is an integrated structure.

4. The array substrate according to claim 1, wherein:
a material of the electrochromic layer is a combination of one or more of tungsten oxide, molybdenum oxide, titanium oxide, vanadium oxide, and niobium oxide; or
a material of the electrochromic layer is a combination of one or more of nickel oxide, iridium oxide, cobalt oxide, and rhodium oxide.

5. The array substrate according to claim 1, wherein the first reflective electrode and the second reflective electrode has the same material and thickness.

6. The array substrate according to claim 1, wherein an amount of the second reflective electrode is multiple, and a distance between any one of the second reflective electrode and the first reflective electrode is 1~10 microns.

7. The array substrate according to claim 1, wherein the common electrode layer is a transparent conductive electrode.

8. The array substrate according to claim 1, wherein the array substrate further comprises a fingerprint identification layer provided on a side of the common electrode layer away from the base substrate.

9. A method for preparing an array substrate, comprising:
providing a base substrate;
forming a driving circuit layer on a side of the base substrate, wherein the driving circuit layer is provided with a first driving circuit and a second driving circuit;
forming a reflective electrode layer on a side of the driving circuit layer away from the base substrate, wherein the reflective electrode layer is provided with a first reflective electrode and a second reflective electrode, the first reflective electrode is electrically connected to an output terminal of the first driving circuit and insulated from the second reflective electrode, and the second reflective electrode is electrically connected to an output terminal of the second driving circuit;
forming a light-emitting layer, wherein the light-emitting layer comprises a light-emitting unit disposed on a surface of the second reflective electrode away from the base substrate, wherein the light-emitting unit is a light-emitting diode;
forming an electrochromic layer, wherein the electrochromic layer covers a surface of the first reflective electrode away from the base substrate;
forming a common electrode layer, wherein the common electrode layer covers a surface of the electrochromic layer away from the base substrate and a surface of the light-emitting unit away from the base substrate;
forming a pixel defining layer on a side of the driving circuit layer away from the base substrate, wherein the pixel defining layer is formed with a hollowed-out second pixel window, the second reflective electrode is arranged in the second pixel window, and the first reflective electrode covers a side of the pixel defining layer away from the base substrate; and
forming a passivation protection layer between the reflective electrode layer and the common electrode layer, wherein the passivation protection layer is formed with a hollowed-out third pixel window, and the light-emitting unit is embedded in the third pixel window.

10. A display panel, comprising an array substrate, wherein the array substrate comprises:
a base substrate;
a driving circuit layer provided on a side of the base substrate, wherein the driving circuit layer is provided with a first driving circuit and a second driving circuit;
a reflective electrode layer provided on a side of the driving circuit layer away from the base substrate, wherein the reflective electrode layer is provided with a first reflective electrode and a second reflective electrode, the first reflective electrode is electrically connected to an output terminal of the first driving circuit and insulated from the second reflective electrode, and the second reflective electrode is electrically connected to an output terminal of the second driving circuit;
a light-emitting layer comprising a light-emitting unit disposed on a surface of the second reflective electrode away from the base substrate;
an electrochromic layer provided on a surface of the first reflective electrode away from the base substrate; and
a common electrode layer covering a surface of the electrochromic layer away from the base substrate and a surface of the light-emitting unit away from the base substrate,
wherein the array panel further comprises a pixel defining layer provided on a side of the driving circuit layer away from the base substrate, wherein the pixel defining layer is formed with a hollowed-out second pixel window, the second reflective electrode is arranged in the second pixel window, and the first reflective electrode covers a side of the pixel defining layer away from the base substrate, and
wherein the light-emitting unit is a light-emitting diode, and the array panel further comprises a passivation protection layer provided between the reflective electrode layer and the common electrode layer, wherein the passivation protection layer is formed with a hollowed-out third pixel window, and the light-emitting unit is embedded in the third pixel window.

11. The display panel according to claim 10, wherein an amount of the second reflective electrode is multiple, and the first reflective electrode is formed with a plurality of hollowed-out first pixel windows in one-to-one correspondence with each of the second reflective electrodes, and any one of the second reflective electrodes is arranged in the corresponding first pixel window.

12. The display panel according to claim 10, wherein the first reflective electrode is an integrated structure.

13. The display panel according to claim 10, wherein:
a material of the electrochromic layer is a combination of one or more of tungsten oxide, molybdenum oxide, titanium oxide, vanadium oxide, and niobium oxide; or
a material of the electrochromic layer is a combination of one or more of nickel oxide, iridium oxide, cobalt oxide, and rhodium oxide.

14. A driving method of a display panel, for driving the display panel according to claim 10, wherein the driving method of the display panel comprises:
applying a first control signal to the first driving circuit, so that the first driving circuit applies a first control voltage to the first reflective electrode according to the first control signal; applying a first common voltage to the common electrode layer, so that a potential difference between the first reflective electrode and the common electrode layer is within a first preset range, so that the electrochromic layer is in a transparent state; and
applying a second control signal to the first driving circuit, so that the first driving circuit applies a second control voltage to the first reflective electrode according to the second control signal; applying a second common voltage to the common electrode layer, so that a potential difference between the first reflective electrode and the common electrode layer is within a second preset range, so that the electrochromic layer is in an opaque state.

* * * * *